(12) United States Patent
Savino

(10) Patent No.: US 11,547,134 B2
(45) Date of Patent: Jan. 10, 2023

(54) FOOD AND BEVERAGE PRODUCT

(71) Applicant: Plant Tap, LLC, North Salem, NY (US)

(72) Inventor: Joseph Camillo Savino, North Salem, NY (US)

(73) Assignee: Plant Tap, Inc., Brewster, NY (US)

(*) Notice: Subject to any disclaimer, the term of this patent is extended or adjusted under 35 U.S.C. 154(b) by 193 days.

(21) Appl. No.: 16/827,453

(22) Filed: Mar. 23, 2020

(65) Prior Publication Data

US 2020/0297010 A1 Sep. 24, 2020

Related U.S. Application Data

(63) Continuation-in-part of application No. 16/409,759, filed on May 10, 2019, and a continuation-in-part of application No. 16/782,046, filed on Feb. 4, 2020.

(60) Provisional application No. 62/821,644, filed on Mar. 21, 2019.

(51) Int. Cl.
*A23L 7/00* (2016.01)
*A23L 7/10* (2016.01)
*A23L 29/00* (2016.01)

(52) U.S. Cl.
CPC ............... *A23L 7/198* (2016.08); *A23L 29/06* (2016.08)

(58) Field of Classification Search
CPC .................... A23L 7/198; A23L 29/06
See application file for complete search history.

(56) References Cited

U.S. PATENT DOCUMENTS

| 2,614,738 A | 10/1952 | Mills |
| 3,251,550 A | 5/1966 | Axel et al. |
| 3,542,342 A | 11/1970 | Barron |
| 3,857,977 A * | 12/1974 | Huessy ............... A23P 30/20 426/583 |

(Continued)

FOREIGN PATENT DOCUMENTS

| CN | 104782773 A | 7/2006 |
| CN | 104799281 A | 7/2006 |

(Continued)

OTHER PUBLICATIONS

Nut Milk Wet Blending Machines, Aug. 15, 2016, https://www.alibaba.com/product-detail/nut-milk-wet-blending-machines_60465570199.html?spm=a2700.7724857.0.0.Pd0spa.

*Primary Examiner* — Anshu Bhatia
(74) *Attorney, Agent, or Firm* — Finnegan, Henderson, Farabow, Garrett & Dunner, L.L.P (57) ABSTRACT

A method for forming a grain-based cereal paste that includes preparing a mixture of the paste and water at a target first cereal-to-water weight ratio, boiling the mixture for a target boiling duration of time, cooling the mixture to a prescribed temperature for a target cooling duration of time, adding enzymes to the mixture, the amount of enzymes calculated based on a dry weight of the paste in the mixture, maintaining the mixture with added enzymes for a specified duration of time at a specified temperature, preparing a dehydrated mixture by removing water from the mixture to result in a prescribed moisture content for the dehydrated mixture, admixing a plant based oil to the dehydrated mixture at a prescribed oil-to-mixture weight ratio, and milling the dehydrated mixture containing the admixed plant based oil to prepare a paste with a particle size in a range of 1 to 120 microns.

10 Claims, 4 Drawing Sheets

(56) References Cited

U.S. PATENT DOCUMENTS

| | | |
|---|---|---|
| 4,121,301 A | 10/1978 | De Francisci |
| 4,595,131 A | 6/1986 | Ruskin et al. |
| 4,643,906 A | 2/1987 | Pitz |
| 4,744,992 A | 5/1988 | Mitchell et al. |
| 4,759,472 A | 7/1988 | Stenger |
| 4,800,097 A | 1/1989 | Morris et al. |
| 4,871,373 A | 10/1989 | Kiener et al. |
| 4,894,242 A | 1/1990 | Mitchell et al. |
| 5,018,646 A | 5/1991 | Billman et al. |
| 5,312,020 A | 5/1994 | Frei |
| 5,899,563 A | 5/1999 | Karras |
| 5,918,768 A | 7/1999 | Ford |
| 5,927,553 A | 7/1999 | Ford |
| 5,975,357 A | 11/1999 | Topar |
| 5,975,365 A | 11/1999 | Hsieh |
| 6,007,236 A | 12/1999 | Maguire |
| 6,123,976 A | 9/2000 | Stoddard |
| 6,153,247 A | 11/2000 | Stoddard |
| 6,293,693 B1 | 9/2001 | Rodgers et al. |
| 6,419,120 B1 | 7/2002 | Bertone |
| 6,428,828 B1 | 8/2002 | Jackson et al. |
| 6,485,773 B1 | 11/2002 | Myers |
| 6,550,648 B2 | 4/2003 | Bardin |
| 6,553,779 B1 | 4/2003 | Boyer et al. |
| 6,874,660 B2 | 4/2005 | Bertone |
| 7,036,687 B1 | 5/2006 | Lowe |
| 7,368,140 B2 | 5/2008 | Tabata |
| 7,829,128 B2 | 11/2010 | Karwowski et al. |
| 8,333,301 B2 | 12/2012 | Majer |
| 8,695,483 B2 | 4/2014 | Koopman et al. |
| 2003/0230604 A1 | 12/2003 | Huffer |
| 2004/0035884 A1 | 2/2004 | de la Guardia |
| 2006/0157602 A1 | 7/2006 | Wang |
| 2006/0209624 A1 | 9/2006 | Hoogland |
| 2006/0249535 A1 | 11/2006 | Mauger et al. |
| 2007/0026128 A1 | 2/2007 | Jarrett |
| 2007/0128335 A1 | 6/2007 | Iwamoto et al. |
| 2007/0148318 A1 | 6/2007 | Rubio et al. |
| 2009/0236361 A1 | 9/2009 | Doelman et al. |
| 2011/0064862 A1 | 3/2011 | McCready |
| 2011/0086158 A1 | 4/2011 | Aremu et al. |
| 2012/0037660 A1 | 2/2012 | Bacellar et al. |
| 2013/0062366 A1 | 3/2013 | Tansey |
| 2013/0258799 A1 | 10/2013 | Christy et al. |
| 2014/0175124 A1 | 6/2014 | Nathan |
| 2014/0193563 A1* | 7/2014 | Carder ............... A23L 33/20 426/549 |
| 2014/0197202 A1 | 7/2014 | Soh et al. |
| 2015/0043302 A1 | 2/2015 | Kamiya et al. |
| 2015/0366254 A1 | 12/2015 | Kesier et al. |
| 2016/0114297 A1 | 4/2016 | Perez et al. |
| 2016/0338389 A1 | 11/2016 | Malone et al. |
| 2018/0035841 A1 | 2/2018 | Savino |

FOREIGN PATENT DOCUMENTS

| | | |
|---|---|---|
| CN | 201044718 Y | 4/2008 |
| CN | 191861894 B | 8/2012 |
| CN | 102836667 A | 12/2012 |
| CN | 103636804 A | 3/2014 |
| CN | 104286185 A | 1/2015 |
| CN | 104304480 A | 1/2015 |
| CN | 104397182 A | 3/2015 |
| CN | 104489103 A | 4/2015 |
| WO | WO 2006/128561 A1 | 12/2006 |
| WO | WO-2013/078510 A1 | 6/2013 |

* cited by examiner

FOOD AND BEVERAGE PRODUCT

CROSS-REFERENCE TO RELATED APPLICATIONS

This application claims priority of U.S. Provisional Patent Application Ser. No. 62/821,644 entitled "Food and Beverage Product," filed Mar. 21, 2019, U.S. patent application Ser. No. 16/409,759 entitled "Food and Beverage Product," filed May 10, 2019, International Patent Application No. PCT/US2019/031884, entitled "Food and Beverage Product," filed May 10, 2019, U.S. patent application Ser. No. 16/782,046 entitled "System And Method for Dispensing a Beverage," filed Feb. 4, 2020, and International Patent Application No. PCT/US2020/16669, entitled "System And Method for Dispensing a Beverage," filed Feb. 4, 2020, the disclosures of which are expressly incorporated by reference herein in their entireties for all purposes.

TECHNICAL FIELD

The present disclosure relates to a system and method for forming a food and beverage product and more particularly, to a food and beverage product made from oats.

BACKGROUND

The beneficial health effects of dietary fibers are well-known. In this context, there has been a growing interest in food products made from grains, such as oats and barley. In many respects, oats are different than other grains. They have higher protein and fat content than comparable cereals as well as a high β-glucan content. In recent years, there has been a growing interest in food products made from oats. The main reason for this is that oat fibers have been found to have a wholesome effect by lowering the serum cholesterol level of hypercholesteremic individuals. Another reason is that oats contain protein of high food value as well as a considerable proportion of mono and polyunsaturated fats. In addition, oats contain many essential amino acids and minerals.

A great advantage of oats is that the whole grain can be used for making various products once the hull has been removed. In oats, the most nutritious substances are distributed fairly evenly in the whole grain. In other grains, the nutritious substances are frequently concentrated in specific parts of the grain.

Oats (also referred to as cereal) paste can be used in forming a milky product which can be used as an alternative to milk, especially for lactose-intolerant people. It may also be used as the basis of or an additive in the manufacture of ice-cream, gruel, yogurt, milkshakes, health drinks, and snacks. However, this process is time-consuming and may result in a product that may not have consistency and/or taste of milk. For example, the overall viscosity and/or sugar content of the cereal suspension may be difficult to control.

Accordingly, there is a need for providing systems and methods that improve the production of cereal paste. The disclosed system and methods address the problems set forth above as well as other deficiencies in existing systems and methods.

The disclosed system and methods further describe ways to form a milky product from the cereal paste and to dispense the milky product to a consumer

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

SUMMARY

Disclosed embodiments provide systems and methods for forming a grain-based paste (e.g., a cereal paste made from oats).

Consistent with a disclosed embodiment, a method for forming a grain-based paste is provided. The method includes preparing a mixture of the paste and water at a target first cereal-to-water weight ratio, boiling the mixture for a target boiling duration of time, cooling the mixture to a prescribed temperature for a target cooling duration of time, adding enzymes to the mixture, the amount of enzymes calculated based on a dry weight of the paste in the mixture, maintaining the mixture with added enzymes for a specified duration of time at a specified temperature, preparing a dehydrated mixture by removing water from the mixture to result in a prescribed moisture content for the dehydrated mixture, admixing a plant based oil to the dehydrated mixture at a prescribed oil-to-mixture weight ratio, and milling the dehydrated mixture containing the admixed plant based oil to prepare a paste with a particle size in a range of 1 to 120 microns.

The foregoing general description and the following detailed description are exemplary and explanatory only and are not restrictive of the claims.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments are related to systems and methods for forming a cereal paste such as oats-based paste. While various aspects of the disclosure discuss oats-based paste, it should be noted that various embodiments may not be limited to oats-based paste and may be applied to paste formed from other grains or nuts such as quinoa, Kamut, wheat, spelt, rye, oats, wild rice, fonio, teff, coconut, almond, brazil nut, cashew, pinenut, hazelnut and/or the like.

However, some aspects of the processing steps used to form oats-based paste may differ for oats as compared to other grains, such as oats, in many respects, are different from other cereals. For example, oats have higher protein and fat contents as well as a lower carbohydrate content than comparable cereals. In addition, oats have a high starch content and do not contain a significant amount of oil.

Consistent with disclosed embodiments, a system and a method for providing an efficient, selective and economical method for producing a cereal paste and cereal suspension is provided. The cereal suspension is formed to have viscosity and taste that may be similar to milk or grain-based or nut-base milk products. In addition, a system and a method for forming a homogeneous and stable cereal suspension containing intact vitamins and soluble dietary fibers (e.g., β-glucans) are provided. In various embodiments, a cereal suspension may be a movable liquid (i.e., has a consistency of paint or cream) that may be shelf stable due to low moisture content (e.g., moisture content may be less than 12%).

Figure 1:
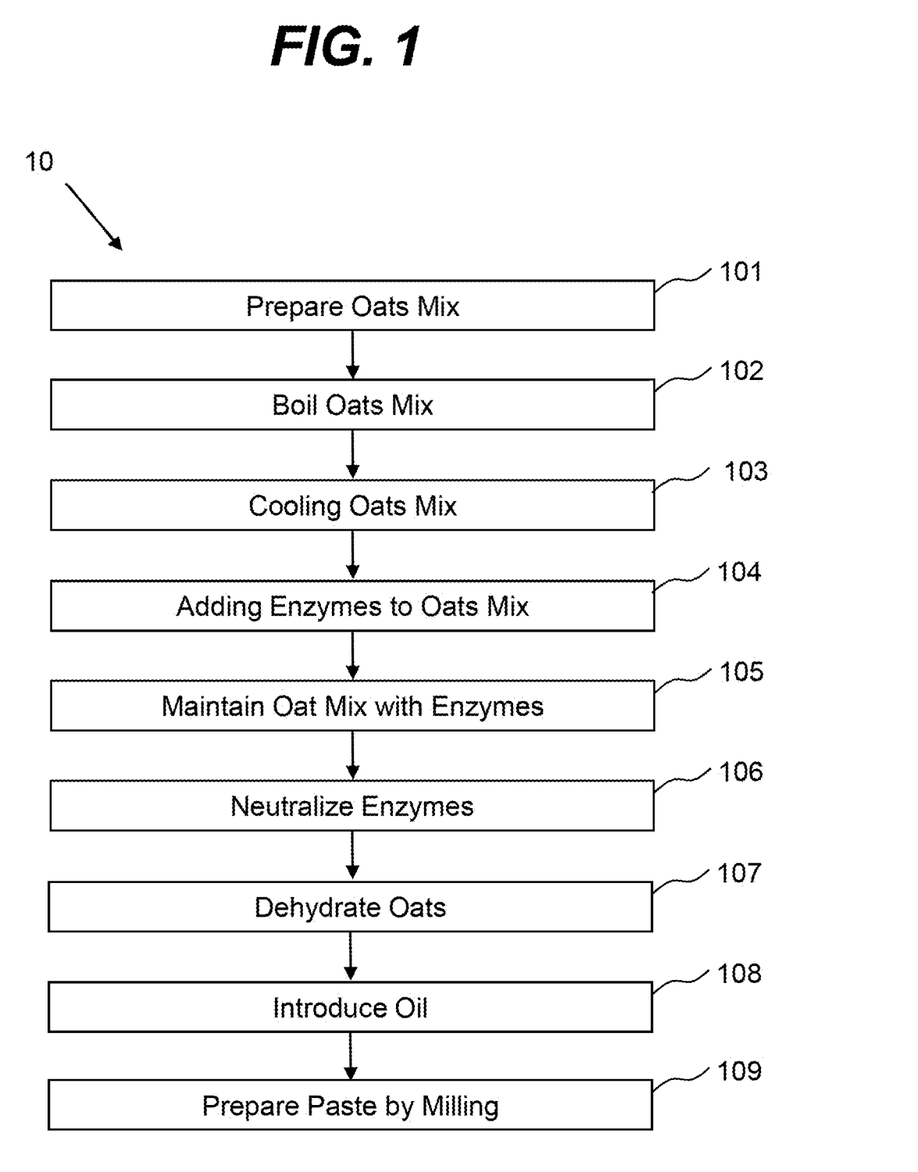
FIG. 1 is an illustrative process of forming a cereal paste consistent with disclosed embodiments.

Various steps of the method of forming cereal paste are described by a process 10 shown in FIG. 1. At a step 101, of process 10, oats (e.g., rolled oats, steel cut oats, Irish oats, Scottish oats, old fashion oats, whole oat groats, etc.) are mixed with water at a suitable ratio. In an example embodiment, oats may be mixed with water at a weight ratio of 1:1 or 1:10. In an example embodiment, a weight ratio in the rage of 1:1 to 1:10 may be used. For example, in an embodiment, a weight ratio of 1:2 may be used. It should be understood that the above weight ratios are suggestive and/or illustrative, and in some embodiments, other ratios may be used. The term "weight ratio" refers to the ratio of the weight of oats to the weight of water.

At step 102 the mix of oats and water may be brought to a boil, and subsequently boiled for a target duration of time. In an example embodiment, the target duration of time may be one to a few minutes, and in some embodiments, boiling may range from half a minute to a few tens of minutes. In some embodiments, boiling temperature may be 100° C. (212° F.) under standard atmospheric conditions, and in some embodiments, pressurized boiling can be used with boiling temperatures reaching 100 to 150° C. (221 to 302° F.). In some embodiments, a mix of oats and water may be soaked prior to boiling. For example, the mix of oats and water may be soaked for several hours prior to boiling.

After step 102, a step 103 of cooling the mix of oats and water may be taken. In an example embodiment, the mix is cooled to a temperature range of 50 to 70° C. (120 to 160° F.). Cooling may be accompanied by convective cooling (e.g., exposing mix to room temperature), conductive cooling (e.g., placing ice into a cooling mix) or any other appropriate cooling. The cooling process may be a slow process (e.g., cooling for 30 minutes to an hour by exposing mix to room temperature) or a fast process (e.g., by placing mix into a refrigerator, by flowing air above the mix using airflow, or using a cooling heat exchanger).

Once the oat and water mix has been cooled, enzymes may be added at step 104. The amount of enzymes (by weight) is calculated based on oats dry weight. For example, in the mix of 1:10, one pound of oats is mixed with 10 pounds of water, the dry weight of oats is one pound, and this weight is used for calculating the weight of enzymes that are needed to be added. In an example embodiment, the mix of oats and water may be treated with amylase such as α-amylase. The amylase is a protein enzyme that hydrolyzes alpha bonds of large, alpha-linked polysaccharides, such as starch and glycogen, yielding glucose and maltose. Amylase may operate at a relatively high-temperature range of 60-90° C. (140-194° F.) and may result in a rapid reduction of the viscosity of gelatinized starch. In various embodiments, amylase may be added at a weight of 0.15 to 1 percent relative to dry weight of oats. In various embodiments, various types of amylase may be used at various temperatures. For example, α-amylase may be used at a temperature range of 60-90° C. (140-194° F.). In some embodiments, the temperature range may be 60-70° C. (150-160° F.). Additionally, or alternatively, α-amylase may be used as well. In an example embodiment, β-amylase may be used at a temperature range of 54-66° C. (130-150° F.). Additionally, or alternatively, enzymes may be added while cooling the mix of oats and water. For example, while the mix is at relatively high temperature (at an initial stage of the cooling), the α-amylase may be used, and β-amylase may be used at the final stage of the cooling (e.g., at a temperature range of 54-66° C.)

In various embodiments, the pH range for the α-amylase may be 5.5 to 6.5, with a possible maximum at 5.9. The activity of α-amylase may be inactivated below pH 5.0. For β-amylase, the pH range may be different. For example, pH range for β-amylase may be in the range of 4.0-5.0. In an example embodiment, α-amylase may be added first when the mix of oats and water is at a higher temperature and higher pH. After treating the mix with α-amylase, the temperature of the mix may be lowered (e.g., by cooling the mix) and pH may be lowered (e.g., by adding a pH lowering solution (e.g., acidity regulators such as sorbic acid, citric acid, etc.). It should be understood, that in various embodiments, only one type of amylase may be added. For example, only α-amylase may be added.

In various embodiments, a glucoamylase, also known as amyloglucosidase or AMG, may be added either simultaneously with α-amylase or β-amylase or following the addition of α-amylase or β-amylase. In an example embodiment, glucoamylase may be added at a weight of 0.2 to 0.5 percent relative to dry weight of oats. Glucoamylase, may break down the starch that occurs naturally in oats. In addition, glucoamylase cleaves off a glucose molecule from the end of starch polysaccharide molecules. Thus, it can also break apart disaccharides (2-sugar molecules) like maltose that may be produced after treating the mix of oats and water with α-amylase or β-amylase.

At a step 105 of process 10, the mix of oats and water with the added enzymes may be maintained at temperatures of (140-160° F.) for a target period of time (e.g., few hours). In an example embodiment, the mix may be maintained at temperatures of (140-160° F.) for a period of time of one to three hours. The exact temperature and time that needed for enzymes to react with the mix of oats and water may vary depending on the type of oats used. For example, for whole oats or rolled oats, it may take a longer time to react with enzymes during step 105. For oats prepared as small pieces, step 105 may be shortened as compared to oats prepared as rolled oats.

At a step 106 of process 10, the enzymes may need to be neutralized. For example, the mix of oats and water may be boiled or roasted in a later process after oats are dried. For example, the mix may be boiled for an hour or any suitable amount of time that is necessary to completely neutralize the enzymes. Additionally, or alternatively, the mix may be placed under increased pressure (i.e., the mix can be pressurized) and heated at a temperature and pressure suitable for neutralizing the enzymes. In an example embodiment, the temperature may be in a range of 180-300° F. and pressures may be 1 to 250 bar of absolute pressure. In an example embodiment, under increased pressure and temperature, enzymes may be neutralized within minutes.

At a step 107 of process 10, the mix of oats and water may be dehydrated to result in oats with low moisture content. In an example embodiment, moisture content may be up to 6% of the entire weight of the resultant dehydrated oats. In another example embodiment, the moisture content may be less than 3% of the entire weight of the resultant dehydrated oats. In some embodiments, however, the moisture content may be less than 2% of the entire weight of the resultant dehydrated oats. Dehydration may be achieved using any suitable means such as using drum dryer or a fluid bed dryer (also referred to as spray dryer), as well as using a roaster/dryer for larger sized oats. It should be noted that any other appropriate drying technique can be used or combined with drum dryer or fluid bed dryer. For example, using an additional step of centrifugation, some of the moisture content may be eliminated prior to using drum dryer or fluid bed dryer. In various embodiments, either partly during drying step 107 or after the completion of the drying step 107, at a step 108, a plant-based oil may be admixed with dehydrated oats. Is should be noted that mixing plant-based oil is possible when the moisture content of oats is sufficiently low. Herein the moisture content may be defined as a ratio of water weight to the weight of the dehydrated mixture that includes oats and enzymes reported as percentage. For example, the moisture content of oats may be less than 3%, or even less than 2%. In an example embodiment, oil-to-oats weight ratio may be 2/8, or 3/7 or a ratio between 3/7 and 2/8, where ratio 2/8 means, for example, that for every 2 pounds of oil there are 8 pounds of dehydrated oats. In various embodiments, a flavorless plant-based oil can be used. For example, a grapeseed oil, or sunflower oil may be used. In some embodiments, several different types of oils may be used. In an example embodiment, oil may be mixed with oats in any suitable means (e.g., mixers, etc.).

At a step 109 of process 10 dehydrated oats mixed with oil are milled to small particle sizes of 1 to 120 microns. In an example embodiment, the average particle size may be 10 to 20 microns. In various embodiments, oats may be milled using various suitable approaches (e.g., grinder mills such as colloid mills, stone mills, conche, chocolate refiners/melangers, etc.). In an example embodiment, oats may be first milled to a first size (e.g., size of few millimeters) using a first grinder or cutter, and then milled to a second size (e.g., tens of microns) using a second grinder/refiner. In various embodiments, more than two grinders may be used for milling oats. After completion of step 108, the oats and oil mix may form a viscous colloidal substance (e.g., a substance with viscosity and consistency of peanut butter or paint). In various embodiments, the size of the milled particles is selected to produce a shelf stable colloid (i.e., colloid that maintains consistency and the oats and oil do not separate).

After completion of step 109, a cereal paste containing milled oats and oil may be stored into enclosures. For example, the cereal paste may be stored in flexible pouches such as plastic pouches. In an example embodiment, cereal paste with low moisture content (e.g., less than 3% by weight) may preserve well with time.

In various embodiments, other ingredients may be added to the cereal paste that may include various amino acids as well as powders of proteins, fibers, nuts, seeds, grains, functional ingredients and/or spices such as turmeric or matcha, various adaptogens such as maca or ashwagandha, protein isolates (e.g. hemp, or pea protein), and/or the like. The powders of other ingredients have to be milled to about the same particle size as the oats to provide a consistent, stable colloid. In various embodiments, other seeds and/or grains may be processed by suitable enzymes prior to milling them into powders, using steps similar to steps 101-109 of process 10 for forming the oats-based paste. In various embodiments, the overall moisture content has to be low after adding other ingredients, to maintain the stability of colloid solution and to prevent the cereal paste from getting spoiled.

Figure 2:
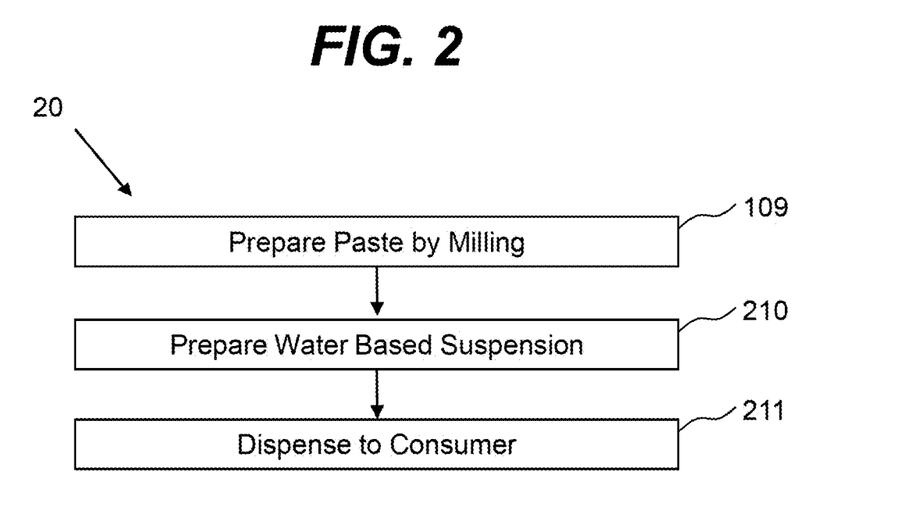
FIG. 2 is an illustrative process of forming a cereal suspension consistent with disclosed embodiments.

FIG. 2 illustrates process 20 for forming a cereal suspension form the cereal paste. At step 109 the cereal paste may be prepared as described above. At a step 210, the cereal suspension may be formed by mixing water and the cereal paste. In an example embodiment, the cereal paste may be mixed/emulsified with water at a weight ratio that may range from 5 to 20 percent. In various embodiments, additives and flavors may be added as needed. For example, a syrup may be added for suitable flavor. In some embodiments, a device for dispensing cereal suspension may allow a user to choose the consistency of cereal suspension by selecting desired paste-to-water ratio.

Figure 3:
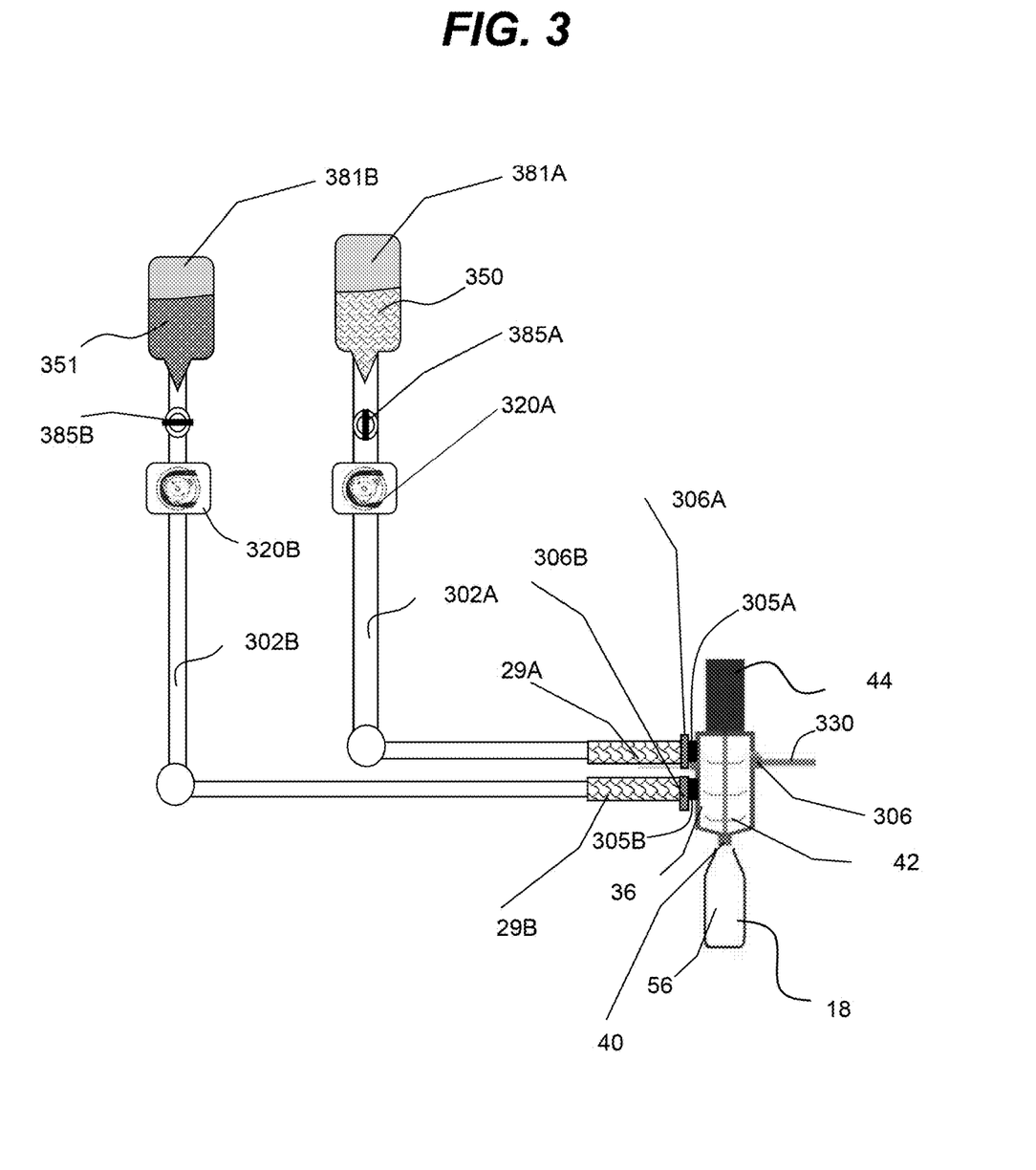
FIG. 3 is an illustrative system for forming and dispensing one or more products consistent with disclosed embodiments.

An exemplary embodiment of a food or beverage product mixing and dispensing machine ("machine") 300 is illustrated in FIG. 3. Machine 300 may be configured to receive, store, and dispense a food or beverage material (e.g., a cereal paste) for use in forming a food or beverage product. Machine 300 may include chambers 381A and 381B, configured to store food or beverage material, such as a cereal paste 350 or a nut-based paste 351 for producing a beverage product 56. Machine 300 may also include dispensing actuators 320A and 320B configured to cause the cereal paste 350 or nut-based paste 351 to be dispensed from corresponding chambers 381A and 381B into a mixing chamber 36 of machine 300. In some embodiments, machine 300 may also include static mixers/emulsifiers 29A and 29B configured to cause material dispensed from chambers 381A or 381B to be at least partially mixed before the material is received by a mixing chamber 36. It should be noted that cereal paste 350 and nut-based paste 351 are only illustrative and any other suitable material for forming food or beverage product may be used.

In various embodiments, chambers 381A and/or 381B may be flexible pouches and may be formed from any food grade material such as high-density polyethylene, polyethylene terephthalate, fluoropolymer and/or the like. In some embodiments, pouches 381A and/or 381B may be formed from a polymeric, plastic, paper, or metal foil material.

In some embodiments, pouches 381A and/or 381B may be cooled to prevent or inhibit the separation of constituent components of the paste material in pouches 381A and/or 381B (e.g., of paste 350 or 351). Pouches 381A and/or 381B may receive or contact a cooling agent to cause contents of the chamber to be cooled. Cooling agents may include materials such as air, water, a refrigerant, a gas, or a cooled substance (e.g., a cooled gas, liquid, or solid material). In some embodiments, pouches 381A and/or 381B may be combined with, connected to, or located in proximity to a cooling device or component. For example, pouches 381A and/or 381B may be surrounded by a component or container (e.g., a cooling jacket) configured to allow a cooling agent to surround and contact pouches 381A and/or 381B for cooling the contents of pouches 381A and/or 381B. In some embodiments, space surrounding the pouches may be cooled (e.g., using a refrigeration system) to allow the pouches to be positioned in a cooled environment for causing the contents of the chamber to be cooled. In various embodiments, machine 300 may include more than two pouches, and in some embodiments, machine 300 may contain at least some of the chambers containing cereal paste or nut-base paste that are not flexible pouches. As used herein pouches 381A and 381B may be referred to as pouches or chambers interchangeably.

In various embodiments, chambers 381A and 381B may use separate conduits 302A and 302B, separate dispensing actuators 320A and 320B, separate valves 385A and 385B as well as separate static mixers/emulsifiers 29A and 29B for dispensing cereal paste 350 or nut-based paste 351 into mixing chamber 36. By separating dispensing lines of various products (herein dispensing line may refer to all of the components used to dispense a product, e.g., conduits, actuators, mixers, and valves), machine 300 is configured to prevent mixing of various products (e.g., prevent mixing of cereal paste 350 and nut-based paste 351).

Dispensing actuators 320A and 320B may be configured to dispense material, such as paste 350 and 351, from pouches 381A-381B into other components of machine 300. In some embodiments dispensing actuators 320A and/or 320B may be a peristaltic pump (herein also referred to as peristaltic pump 320A and/or peristaltic pump 320B). The peristaltic pumps may dispense or dose material from the pouches into mixing chamber 36 via a static mixers 29A and/or 29B. Static mixers 29A and/or 29B may be configured to receive material exiting chambers 381A and/or 381B and to cause the material to be at least partially mixed by passing through the static mixers. For example, static mixer 29A and/or 29B may be generally tubular and may have any suitable shape (e.g., circular, rectangular, or other cross-section) or construction. The static mixers may include stationary (i.e., "static") components, such as a plurality of surfaces, blades, fins, or other protrusions. The components of the static mixers may be arranged in a predetermined uniform pattern or may be positioned in a non-uniform or random arrangement. The arrangement of components of static mixer 29A and/or 29B may be designed to achieve at least some or an optimum or other desired amount of mixing or agitation of material exiting the pouches. For example, the components of the static mixers may be designed or configured to cause separated constituents of material 350 and 351 to be remixed, infused, or otherwise combined (i.e., to reduce or reverse separation) during passage through static mixer 29. In some embodiments, static mixer 29 may include a screen, mesh, grate, foam, or other structured component configured to cause agitation or turbulence in the material passing through a static mixer. Static mixer 29 may achieve mixing of the constituents of material 350 and/or 351 without additional moving parts that could add cost and/or complexity to machine 300. In some embodiments, machine 300 may not include static mixer 29. In other embodiments, machine 300 may include multiple static mixers (e.g., of the same or different types) at various locations along conduits 302A and/or 302B.

In various embodiments, machine 300 may include a mixing chamber 36 configured to receive material from one of the pouches (e.g., via a conduit 302A, or 302B and/or static mixer 29A and/or 29B) and/or from other sources. Mixing chamber 36 may have any suitable shape, such as a cylindrical, spherical, rectangular, or another shape. Mixing chamber 36 may be formed of any suitable material, such as metal, NSF compliant stainless steel, plastic, glass, and/or another type of material. In some embodiments, mixing chamber 36 may include an openings 305A and 305B for receiving material from the pouches and an outlet 40 (also referred as a dispensing nozzle) for dispensing material (e.g., a food or beverage product) from mixing chamber 36. In some embodiments, mixing chamber 36 may be cooled. For example, mixing chamber 36 may be surrounded by a component or container (e.g., a cooling jacket) configured to allow a cooling agent to surround and contact mixing chamber 36 for cooling the contents the mixing chamber. In some embodiments, space surrounding mixing chamber 36 may be cooled (e.g., using a refrigeration system) to allow mixing chamber to be positioned in a cooled environment for causing the contents of the chamber to be cooled.

In various embodiments, conduits 302A and 302B may be connected to chamber 36 via valves 306A and 306B. Valve 305 may be configured to only allow the flow of cereal paste or nut-based paste from pouches 381A or 381B to mixing chamber 36. For example, valve 305 may be a check valve or a poppet valve and/or the like. Similarly, conduit 302A and 302B may be connected to pouches 381A and 381B via respective valves 385A and 385B. For example, the opening of valve 385A and/or 381B may allow the flow of material from pouch 381A (381B) to mixing chamber 36 and may prevent flow from mixing chamber 36 towards pouch 381A (381B). In an example embodiment, valve 381A and/or 381B may be a check valve or a poppet valve and/or the like. In an example embodiment, when valve 381A is open, valve 381B may be closed, thus allowing only one type of material (e.g., only cereal paste 350) to flow into mixing chamber 36. FIG. 3 shows, for example, that valve 385B is closed, and valve 385A is open. However, in an alternative configuration, several different products may be flown into mixing chamber 36. In an example embodiment, machine 300 may provide an interface for the user to adjust the flow rate of different products for a desired ratio of products within mixing chamber 36.

Mixing chamber 36 may also include a mixing tool 42 driven by a mixing actuator 44. Mixing tool may be configured to mix food or beverage materials within mixing chamber 36. Mixing tool 42 may be shaped to promote mixing of materials within mixing chamber 36. For example, mixing tool 42 may include bars, hooks, blades, paddles, whisks, beaters, spatulas, and/or other shapes, tools, or devices. It is contemplated that mixing tool 42 may include one or more shapes, tools, or devices (i.e., it may include a single shape, tool, or device or multiple shapes, tools, or devices). In some embodiments, mixing tool 42 may also or alternatively include one or more components configured to scrape or wipe interior portions of mixing chamber 36. For example, mixing tool 42 may include one or more paddles, extensions, wipers, etc., configured to contact interior portions of mixing chamber 36 to collect, dislodge, or wipe material thereon.

Mixing actuator 44 may be or include a motor. The motor of mixing actuator 44 may be or include an electric motor, such as a direct current (DC) motor or servomotor. It is contemplated that the motor of mixing actuator 44 may alternatively be or include an alternating current (AC) electric motor. In some embodiments, amount of force and/or speed at which mixing tool 42 is rotated may partially define the requirements (and thus the design) of the motor of mixing actuator 44 and/or the suitability of various types of commercially available motors that may be used. For example, in some instances, the motor of mixing actuator 44 may only be required to achieve a single speed or power level. In other embodiments, the motor of mixing actuator 44 may be required to achieve multiple speeds. The motor of mixing actuator 44 may be an electric motor or a different type of motor, such as a pneumatically driven or hydraulically driven motor. It is to be appreciated that similar considerations of speed and power requirements of the motor of mixing actuator 44 may be addressed for pneumatic or hydraulic motors by considering motor parameters, such as pressure, displacement, rotational speed, rotational direction, as well as application considerations (e.g., size, cost, complexity, serviceability, maintenance, sanitation, etc.). It is to be appreciated that the motor of mixing actuator 44 may be equipped with a suitable power source, such as an electrical power source (e.g., a battery, a capacitor, a power supply, a direct connection to utility power, etc.), a pneumatic power source (e.g., a compressor, a tank, an accumulator, etc.), a hydraulic power source (e.g., a pump, a tank, an accumulator, etc.), and associated electrical or mechanical conduit.

Mixing chamber 36 may include one or more additional openings having valves configured to receive materials or process aids from one or more input sources (e.g., water source). For example, mixing chamber 36 may include a second opening for conduit 330 configured to receive water from a water source. Conduit 330 may be connected to mixing chamber 36 via valve 306. In various embodiments, valve 306 may be configured to only allow flow from the water source to mixing chamber 36. For example, valve 306 may be a check valve or a poppet valve and/or the like.

In various embodiments, machine 300 may be cleaned to prevent microbial growth and to maintain a sterile environment. In an example embodiment a clean-in-place (CIP) system designed for cleaning machine 300 may be provided. CIP system may include periodic internal cleaning and may include a fully automated system with programmable logic controllers, multiple tanks, sensors, valves, heat exchangers, data acquisition and specially designed spray nozzle systems.

In an example embodiment, machine 300 may be cleaned with CIP cleaner such as AFCO 5229, AFCO 2548, 5222 HD CIP 20, AFCO 5235 Super CIP 200 and/or the like, and sanitized with CIP sanitizer such as AFCO 4325, PER OX SAN, AFCO 4312 VIGILQUAT and/or the like. In various embodiments, the cleaning liquids may be stored at high concentration in a locked area accessible by trained technicians with appropriate safety gear. In various embodiment, the process of cleaning machine 300 may be described by a process 400 shown in FIG. 4. At a step 401 of process 400, the system may be first pre-rinsed with water (e.g., purified water, water treated with disinfectants, heat or UV radiation, etc.) that may be performed to wet the interior surface of the mixing chamber 36, conduits 302A and 302B, and mixers 29A and 29B, and remove residue. It also may provide a non-chemical pressure test of the CIP flow path.

Figure 4:
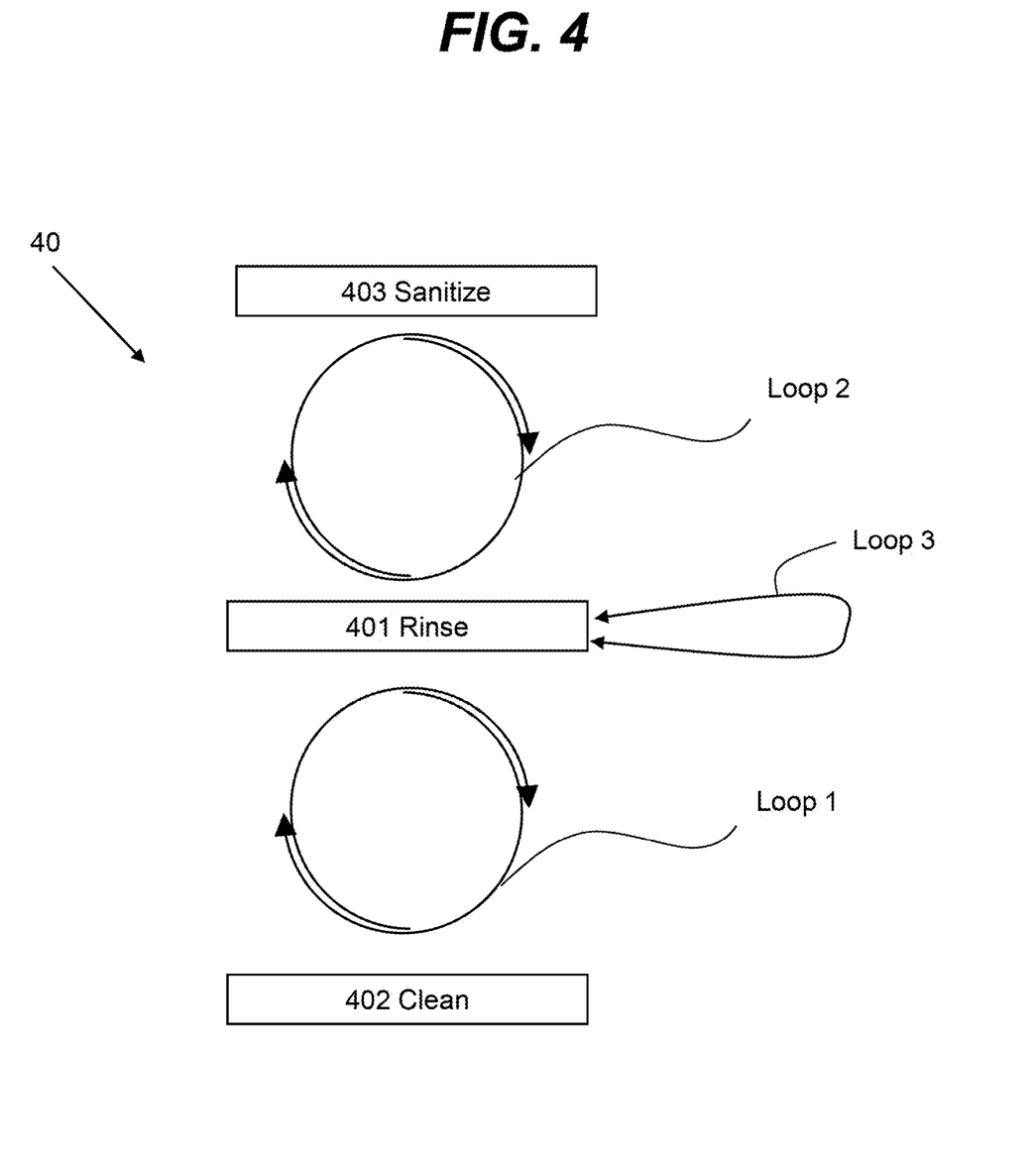
FIG. 4 is an illustrative system for cleaning a dispensing machine consistent with disclosed embodiments.

At a step 402 a CIP cleaner may be introduced into the components of machine 300 (e.g. into mixing chamber 36, conduits 302A and 302B, and mixers 29A and 29B). In some embodiments a doser may select the required dose (e.g. volume) for CIP cleaner prior to the introduction of the cleaner into the components of machine 300. In various embodiments, CIP concentrated cleaner may be diluted prior to being used for cleaning the components of machine 300. In various embodiments, CIP cleaner and/or water for diluting the cleaner may be maintained at the room temperature or be heated to a suitable temperature. The dose of concentrated CIP cleaner may be measured and controlled by any suitable means, including for example a Venturi System and can be delivered to the components of machine 300 via a doser/venturis. In various embodiments, CIP cleaner may be forced at high pressure/speed into the components of machine 300. Various valves may be opened or closed to control the output of pre-determined concentrations of CIP cleaner from the doser/venturis into mixing chamber 36. In various embodiments, CIP cleaner may include surfactants and caustics.

In various embodiments, process 400 may include one or more iterations between steps 401 and 402 schematically indicated by a loop 1 in FIG. 4. For example, process 400 may include a single sequence of step 401 (rinse step) and step 402 (clean step), or it may include several repeats of this sequence. Once loop 1 is completed, at a step 403 the components of machine 300 may be sanitized. For example, at a step 403 a CIP sanitizer may be introduced into the components of machine 300 (e.g. into mixing chamber 36, conduits 302A and 302B, and mixers 29A and 29B). In some embodiments a doser may select the required dose (e.g. volume) for CIP sanitizer prior to the introduction of the sanitizer into the components of machine 300. In various embodiments, CIP concentrated sanitizer may be diluted prior to being used for cleaning the components of machine 300. In various embodiments, CIP sanitizer and/or water for diluting the cleaner may be maintained at the room temperature or be heated to a suitable temperature. The dose of concentrated CIP sanitizer may be measured and controlled by any suitable means, including for example a Venturi System and can be delivered to the components of machine 300 via a doser/venturis. In various embodiments, CIP sanitizer may be forced at high pressure/speed into the components of machine 300. Various valves may be opened or closed to control the output of pre-determined concentrations of CIP sanitizer from the doser/venturis into mixing chamber 36. In various embodiments, CIP sanitizer may include peracetic acids. In an example embodiment, CIP sanitizer may be left in mixing chamber 36 all the way down to the outlet 40 overnight to ensure no microbial growth.

In various embodiments, process 400 may include one or more iterations between steps 401 and 403 schematically indicated by a loop 2 in FIG. 4. For example, process 400 may include a single sequence of step 401 (rinse step) and step 403 (sanitize step), or it may include several repeats of this sequence. Once loop 1 is completed, the last cleaning step may be rinsed step 401 that may be followed by blowing air through the components of machine 300 and drying the components.

Critical parameters must be met and remain within the specification for the duration of the cycle. If the specification is not reached or maintained, cleaning will not be ensured and will have to be repeated. Critical parameters include temperature, flow rate/supply pressure, chemical concentration, chemical contact time, and final rinse conductivity (which shows that all cleaning chemicals have been removed).

In various embodiments, machine 300 may be cleaned several times during the day. For example, the machine may be cleaned in the morning, mid-day and at night. In various embodiments, mixing chamber 36 may be cold water rinsed as often as 5-20 minutes of machine 300 inactivity.

What is claimed is:

1. A method of forming a grain-based cereal paste comprising:
   preparing a mixture of the paste and a water at a target cereal-to-water weight ratio;
   heating the mixture for a target heating duration of time;
   adding a first set of enzymes to the mixture, wherein an amount of the first set of enzymes is calculated based on a dry weight of the cereal paste in the mixture;
   maintaining the mixture with the added first set of enzymes for a specified duration of time at a first prescribed temperature;

cooling the mixture to a second prescribed temperature, wherein the cooling is performed for a target cooling duration of time;

adding a second set of enzymes to the mixture;

maintaining the mixture with the added second set of enzymes for a specified duration of time at the second prescribed temperature;

preparing a dehydrated mixture by removing water from the mixture to result in a prescribed moisture content for the dehydrated mixture;

admixing a plant-based oil to the dehydrated mixture at a prescribed oil-to-mixture weight ratio; and milling the dehydrated mixture containing the admixed plant-based oil to prepare a paste.

2. The method of claim 1, wherein the target first cereal-to-water weight ratio is in a range of one-to-one to one-to-ten weight ratio.

3. The method of claim 1, wherein the target boiling duration of time is in a range of a half a minute to thirty minutes.

4. The method of claim 1, wherein the prescribed temperature is in a range of sixty to seventy degrees Celsius.

5. The method of claim 1, wherein the enzymes include amylase.

6. The method of claim 1, wherein the first set of enzymes include alpha enzymes and the second set of enzymes includes beta enzymes.

7. The method of claim 1, wherein the specified duration of time is in a range of one to three hours.

8. The method of claim 1, wherein the prescribed moisture content is less than three percent.

9. The method of claim 1, wherein the prescribed oil-to-mixture weight ratio is in a range of three over seven to one quarter.

10. The method of claim 1, wherein the paste prepared from the dehydrated mixture containing the admixed plant-based oil has a particle size in a range of 1 to 120 microns.

* * * * *